(12) United States Patent
Dellutri

(10) Patent No.: US 8,274,015 B2
(45) Date of Patent: Sep. 25, 2012

(54) CULINARY HEATER ROLLING PIN DEVICE

(76) Inventor: Maria E. Dellutri, Davie, FL (US)

( * ) Notice: Subject to any disclaimer, the term of this patent is extended or adjusted under 35 U.S.C. 154(b) by 443 days.

(21) Appl. No.: 12/704,983

(22) Filed: Feb. 12, 2010

(65) Prior Publication Data

US 2010/0206864 A1  Aug. 19, 2010

Related U.S. Application Data

(60) Provisional application No. 61/151,906, filed on Feb. 12, 2009.

(51) Int. Cl.
*H05B 1/00* (2006.01)

(52) U.S. Cl. ........ 219/227; 219/228; 219/244; 219/260; 219/481

(58) Field of Classification Search .................. 219/227, 219/228, 244, 260, 481
See application file for complete search history.

(56) References Cited

U.S. PATENT DOCUMENTS

2008/0181664 A1*  7/2008  Yamazaki et al. ............ 399/162
2008/0304878 A1*  12/2008  Matayoshi .................... 399/302

* cited by examiner

*Primary Examiner* — Wai Sing Louie
(74) *Attorney, Agent, or Firm* — David P. Lhota, Esq.; Malin Haley DiMaggio Bowen & Lhota, P.A.

(57) ABSTRACT

A heater rolling pin having a roller body, stainless steel axles, hollow roller interior, roller outer surface, a handle mounted to each axle, electrical tactile switch secured to one end of the roller, a heater secured inside the roller interior, batteries and a battery holder at the opposite end of the roller. The internal heater makes the outer surface of the roller hot. The roller is manufactured from food grade aluminum alloy and is hard anodized and dyed to make the surface very hard and scratch resistant. The roller has two food quality, high density polyethylene (HDPE) plastic handles with stainless steel axles.

9 Claims, 2 Drawing Sheets

CULINARY HEATER ROLLING PIN DEVICE

CROSS REFERENCE TO RELATED APPLICATIONS

This application claims the benefit of provisional patent application Ser. No. 61/151,906 filed Feb. 12, 2009.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to a culinary rolling pin, and more particularly, to a culinary rolling pin having an internal heater for improving the rolling of fondant and other confectionary components allowing the chef to more easily decorate a cake and make other desserts that require rolling, flattening, or stretching.

2. Description of the Background Art

Cake decorating is a culinary art form. Several confectionary coatings have been developed over time to help the culinary artist cover the cake with frosting and make various fillips, making the cake extra special. Fondant is one of the confection mixtures used to cover a cake. It is made by supersaturating sucrose in warm water, adding some flavoring if desired, allowing the mixture cool and then violently whipping the mixture. This action creates a fine crystalline structure confectionary coating with very fine crystals of sugar, making it feel soft and creamy on the tongue, with enough malleability to be rolled out into thin layers.

In use, the fondant is typically rolled into thin layers that are used on wedding cakes or other large cakes because it can be applied to the cake in a relatively thin, evenly rolled layer, which looks exceptionally nice. One problem with the fondant is that it is hard to roll out to an even thickness when it has been stored or refrigerated for a while. Sometimes the fondant can be heated slightly in the microwave to enhance the malleability, however overheating can ruin the crystal structure and the fondant is not useable. If a rolling pin existed that could be reliably and conveniently heated it would make rolling fondant and other confectionary components easier and more efficient. However, there are no known heater rolling pins that adequately address and resolve these problems. Accordingly there exists a need for such a heater rolling pin. The instant invention addresses this unfulfilled need in the prior art by providing a heater rolling pin as contemplated and disclosed herein.

BRIEF SUMMARY OF THE INVENTION

In light of the foregoing, it is an object of the present invention to provide a culinary heatable rolling pin device for rolling fondant.

It is also an object of the instant invention to provide a heated culinary rolling pin that makes it easier and more convenient to roll fondant.

It is another object of the instant invention to provide a heated culinary rolling pin that makes it easier to roll fondant to an even, uniform thickness.

It is an additional object of the instant invention to provide a heated culinary rolling pin that is adapted for easy and efficient use with other confectionary components.

In light of these and other objects, the instant invention comprises a heater rolling pin having a roller, stainless steel axles, hollow roller interior, roller outer surface, a handle mounted to each axle, electrical tactile switch secured to one end of the roller, pins on or in the roller end that slide into channels in the inside surface of the roller, a heater secured inside the roller interior, batteries and a battery holder at the opposite end of the roller. The internal heater makes the outer surface of the roller a few degrees hotter than the fondant or other confection so it can be more easily rolled out into thin uniform layers. The roller is manufactured from food grade aluminum alloy and is hard anodized and dyed to make the surface very hard and scratch resistant. The surface is preferably dyed with a bright colored to enhance the product recognition factor, which can dramatically improve the market adoption of the product. The roller has two food quality, high density polyethylene (HDPE) plastic handles with stainless steel axles.

In accordance with these and other objects, which will become apparent hereinafter, the instant invention will now be described with particular reference to the accompanying drawings.

DETAILED DESCRIPTION OF THE INVENTION

Figure 1:
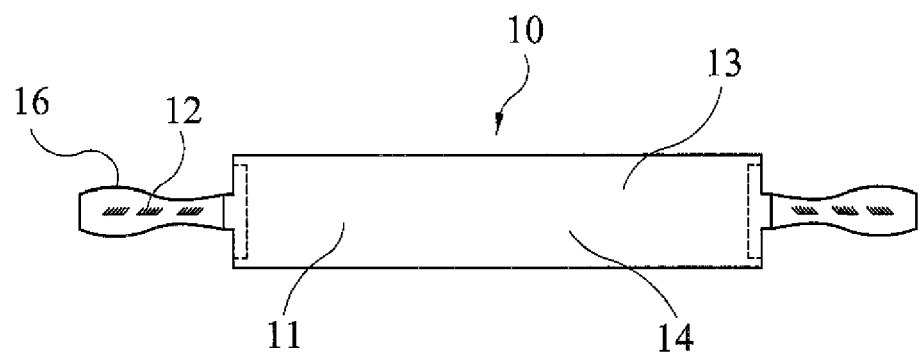
FIG. 1 is an elevational view of the heater rolling pin in accordance with the preferred embodiment of the instant invention.

With reference to the drawings, FIGS. 1 to 4 depict the preferred embodiment of the instant invention which is generally referenced as a heater roller pin, roller pin and, or by numeric character 10. The heater rolling pin 10 is an innovative culinary product that heats the outer surface of the rolling pin a few degrees hotter than the fondant so it can be more easily rolled out into thin uniform layers.

With reference to FIGS. 1-4, the heater rolling pin comprises a roller 11, stainless steel axles 12, hollow roller interior 13, roller outer surface 14, a handle 16 mounted to each axle 16, electrical tactile switch 17 secured to one end 18 of the roller 11, pins 19 on or in the roller end 18 that slide into channels 29 in the inside surface of the roller 11, a heater 20 secured inside the roller interior 13, an o-ring 21 in a groove in the end section 18, plugs and wires 22 electrically connected to the switch 17 and batteries 23, a battery holder 24 at the opposite end of the roller 11 and a door 26 for accessing the battery holder 24 interior to place, remove or replace the batteries 23. The internal heater 20 makes the outer surface 14 of the roller a few degrees hotter than the fondant so it can be more easily rolled out into thin uniform layers. The roller 11 is 3.5" diameter by 11.5" long and the roller surface 14 is manufactured from food grade aluminum alloy and is hard anodized and dyed to make the surface very hard and scratch resistant. The surface 14 is bright colored with dye, which can be supplied in many bright and unusual colors, so a distinctive color may be chosen to enhance the product recognition factor, which can dramatically improve the market adoption of the product. The roller has two food quality, high density polyethylene (HDPE) plastic handles 16 with stainless steel axles 12. The overall length of the roller and handles 10 is preferably 22". The aforementioned dimensions of the roller pin 10 may vary.

The rolling pin 10 is turned on with the sealed switch 17 on one end cap 18 and the internal heater 20 is powered with 8 replaceable D cells. The heater 20 is in intimate contact with the internal surface and puts out enough heat to raise the surface temperature of the aluminum roller 11 in a few seconds. The heat is constant and the heater 20 is sized to put out a finite value of energy so the surface heat of the roller is constant. The roller electrical components 19-22 are sealed and the roller 10 can be washed between uses, but should not be submerged or placed in a dishwasher.

The roller 11 is manufactured from 6061 aluminum alloy extruded seamless tubing. The 3.5" diameter tubing has a 3/16" wall. The aluminum is used because the surface is non-stick when hard anodized and the thermal coefficients of the aluminum provide excellent heat transfer from the heater inside to the material in contact with surface. The seamless tubing is cut to length and the ends are machined to accept the HDPE plastic axle supports. After fabrication, the machined tubing is deburred, hard anodized, and dyed a bright color so it stands out in the retail display. The colors are quite varied and are listed in the table below.

| Dye Colors | Dye Colors |
|---|---|
| Teal | Violet |
| Yellow | Blue |
| Black | Brown |
| Green | Red |
| Bronze | Orange |

The handles 16 and axle supports are molded from food grade HDPE plastic. The plastic axle support is shaped to retain an o-ring against the milled surface on the interior of the tube. The axle support has 4 pins 19 pressed into the holes molded in the periphery of the support. These mate with the grooves 20 molded into the interior of the aluminum roller and the force when closed, compresses the o-ring seal 21 so the internal electrical components are kept dry when the device is washed. One end 18 has the sealed tactile membrane switch 17 adhesively bonded in place. The switch 17 controls the current going to the thin membrane heater 20. The handles are injection molded from the same HDPE material and are held in place with a 3/8" diameter stainless steel rod, which has been swaged to retain the handles for use. The other axles support holds the battery holder, which is adhesively bonded to the axle support. This centers the holder in the rolling pin tube and allows the thin rubber film heater to fit around it.

The heater 20 is an etched foil element that is covered with a thin layer of silicone rubber, with the finished thickness of the heater being 0.018". The 11" long by 9" wide rectangular heater is rolled up into a cylinder and is slipped around the battery holder, inside the rolling pin tube. The rubber heater wants to unroll, so it holds itself against the interior walls of the roller tubing, remaining in intimate contact and providing uniform heating at 0.25 watts per square inch. This level of heating will raise the exterior surface of the rolling pin a few degrees but will not overheat the surface. The heating is rather quick, with the surface coming to temperature in a minute or two after the heater is engaged.

The battery holder 24 is injection molded from polypropylene plastic. It is designed to hold 8 replaceable D cell batteries and has a door that allows easy access to the batteries after the switch axle support is removed from the rolling pin. The battery holder is attached on one end to the axle support and fixed to ride in the center of the rolling pin tube. The battery holder also retains the female connectors for the heater and the on/off switch.

The instant invention 10 is designed to be aesthetic and effective in the application. The relative ease of manufacture and the inexpensive components provide good marketability for the manufacturer. The user benefits from easier rolling of fondant and other decorating materials, which should provide considerable market interest in the product.

The instant invention 10 is illustrated in FIGS. 1-4. With reference to FIG. 1, the hard anodized, non-stick aluminum roller 11 heats up a few degrees to allow the softening of the Fondant when it is being rolled. In use, the fondant is typically rolled into thin layers that are used on wedding cakes or other large cakes because it can be applied to the cake in a relatively thin, evenly rolled layer, which looks exceptionally nice. One problem with the fondant is that it is hard to roll out to an even thickness when it has been stored or refrigerated for a while. Sometimes the fondant can be heated slightly in the microwave to enhance the malleability, however overheating can ruin the crystal structure and the fondant is not useable. The molded plastic handles 16 are supported on molded plastic ends and employ stainless steel handles. The handles 16 are injection molded from the HDPE material and are held in place with a 3/8" diameter stainless steel rod, which has been swaged to retain the handles for use. The natural lubricity of plastic allows the handles 16 to rotate smoothly on the axles 12 and provide an effortless feel to the roller 10. The internal components 17-24 are sealed inside and allow the rolling pin to be washed to remove the rolled food. The rolling pin 10 can be dyed an exciting color, which makes it stand out on the cooking display.

Figure 2:
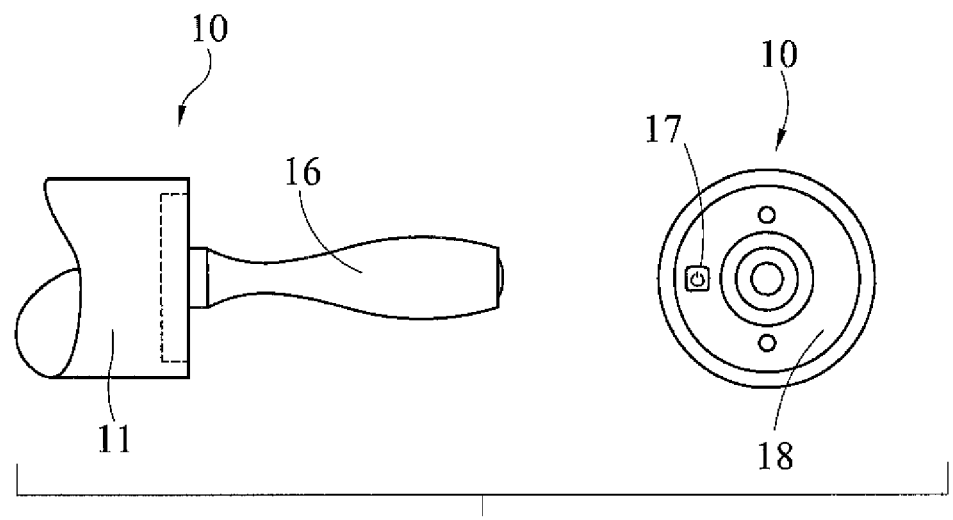
FIG. 2 shows a partial perspective view and end view of the heater rolling pin in accordance with the preferred embodiment of the instant invention.

With reference to FIG. 2, the rolling pin is 3.5" in diameter with a 3/16" wall and is machined from extruded seamless tubing. The roller 11 is manufactured from 6061 aluminum alloy extruded seamless tubing. The 3.5" diameter tubing has a 3/16" wall. The aluminum is used because the surface is non-stick when hard anodized and the thermal coefficients of the aluminum provide excellent heat transfer from the heater inside to the material in contact with surface. The seamless tubing is cut to length and the ends are machined to accept the HDPE plastic axle supports. After fabrication, the machined tubing is deburred, hard anodized, and dyed a bright color so it stands out in the retail display. The handles 16 are mounted on the plastic end pieces using stainless steel rod, which is swaged in place. The rolling pin 10 is turned on and off using the sealed tactile membrane switch 17. As an option, the end 18 can have a small LED inserted so the user can see if the device is on or off. Additionally, the heater 20 can be controlled by a micro-computer and can shut the device off automatically if it has not been moved for 10 minutes. The end 25 is removed to replace the batteries, using a specially designed wrench, which is supplied with the rolling pin.

Figure 3:
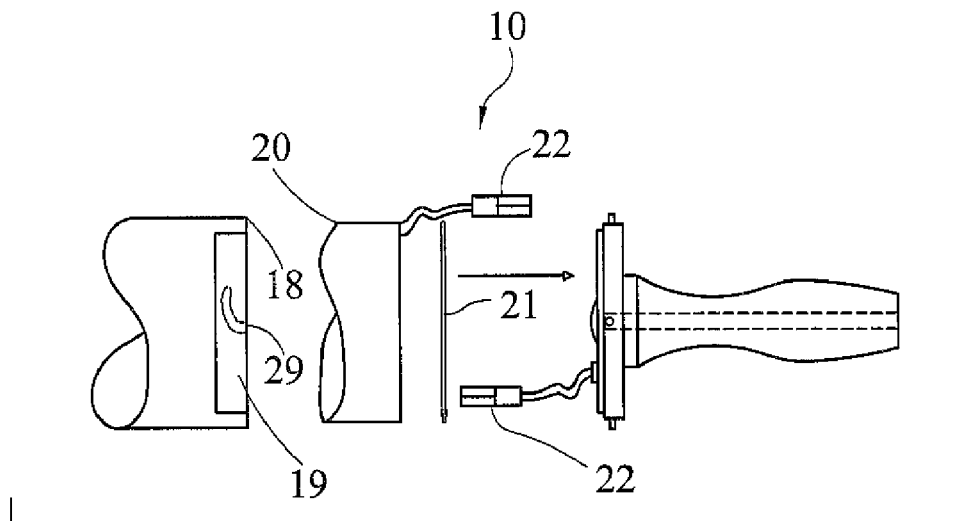
FIG. 3 is a partial perspective and exploded view of the heater rolling pin in accordance with the preferred embodiment of the instant invention.

With reference to FIG. 3, the pins 19 on the roller end section 18 slide into the channels 20 milled into the inside surface of the roller 11. These pins 19 hold the o-ring 21 against the axles support and the mailed edge in the rolling pin tube 13 to prevent moisture intrusion during use and washing. The thin silicone rubber insulated heater 20 is sized to fit snugly against the inside diameter of the rolling pin. The heater 20 is an etched foil element that is covered with a thin layer of silicone rubber, with the finished thickness of the heater being 0.018". The 11" long by 9" wide rectangular heater 20 is rolled up into a cylinder and is slipped around the battery holder, inside the rolling pin tube. The rubber heater 20 wants to unroll, so it holds itself against the interior walls of the roller tubing, remaining in intimate contact and providing uniform heating at 0.25 watts per square inch. This level of heating will raise the exterior surface of the rolling pin a few degrees but will not overheat the surface. The heating is rather quick, with the surface coming to temperature in a minute or two after the heater is engaged. The o-ring 21 fits in the groove machined in the end section and seals the internal cavity against moisture. The on/off switch 17 is connected to the battery holder 24 using polarized plugs 22.

Figure 4:
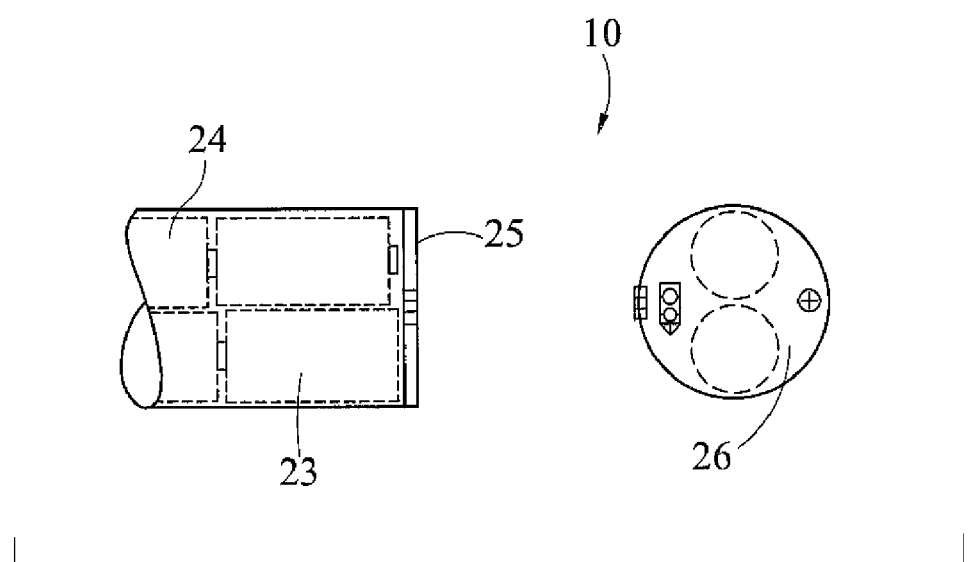
FIG. 4 shows a partial cutaway view and opposite end view of the heater rolling pin in accordance with the preferred embodiment of the instant invention.

With reference to FIG. 4, the molded battery holder 24 retains the 8 replaceable D cells used to heat the roller 11. The battery holder 24 is injection molded from polypropylene plastic. It is designed to hold 8 replaceable D cell batteries and has a door 26 that allows easy access to the batteries after the switch axle support is removed from the rolling pin. The battery holder 24 is attached on one end to the axle support and fixed to ride in the center of the rolling pin tube. The battery holder 24 also retains the female connectors for the heater and the on/off switch 17. The battery holder 24 is attached to the end section 25 opposite the switched end 18. The battery holder 24 is sized to hold the 8 batteries and hold the heater 20 against the interior 13 of the metal shell. The door 26 can be opened and the batteries replaced after the end section is removed.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A culinary rolling pin, said rolling pin comprising:
   a cylindrical roller body;
   means, mechanically engaged with said roller body, for rolling said roller body;
   means, supported in said roller body, for heating said roller body
   a heater secured inside said roller body;
   means for supplying power to said heater;
   at least one battery disposed in said roller body and in electrical communication with said heater; and
   a switch electrically connected between said batter and said heater for selectively controlling the supply of power from said battery to said heater.

2. A rolling pin as recited in claim 1, wherein said means for rolling said roller body comprises:
   a handle disposed on opposite ends of said roller body.

3. A rolling pin as recited in claim 2, wherein said means for rolling said roller body further comprises:
   an axle in mechanical communication with each said handle.

4. A rolling pin as recited in claim 1, wherein said means for rolling said roller body further comprises:
   a plate mechanically engaged with said handle; an
   a recession formed in each said roller end for disposing each said plate.

5. A rolling pin as recited in claim 1, wherein said rolling pin further comprises:
   a battery compartment for holing said at least one battery.

6. A rolling pin as recited in claim 1, wherein said rolling pin further comprises:
   a silicone rubber around said heater.

7. A rolling pin as recited in claim 1, wherein said rolling pin further comprises:
   a door for accessing said battery compartment.

8. A rolling pin as recited in claim 1, wherein said rolling pin further comprises:
   a colored dye on said roller body.

9. A rolling pin as recited in claim 1, wherein said roller body comprises:
   non-stick aluminum.

* * * * *